Aug. 28, 1945.    C. H. McCLASKEY    2,383,662
AIRPLANE TIRE CONSTRUCTION
Filed Aug. 4, 1944

C. H. McClaskey
INVENTOR.

BY A. Knowles.
ATTORNEYS.

Patented Aug. 28, 1945

2,383,662

UNITED STATES PATENT OFFICE 2,383,662

AIRPLANE TIRE CONSTRUCTION

Charles H. McClaskey, Hamer, Idaho

Application August 4, 1944, Serial No. 548,000

2 Claims. (Cl. 244—103)

This invention relates to tires designed for use on the wheels of airplane landing gear, the primary object of the invention being to provide means on the tires for causing the landing wheels to be automatically rotated by wind pressure, when the landing gears are lowered, thereby reducing wear on the tires to a minimum, when the tires contact the landing surface, under the weight of the plane of which the landing gear forms a part.

An important object of the invention is to provide removable cups which may be readily and easily replaced should the same become damaged during the landing of the airplane.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing.

Figure 1:
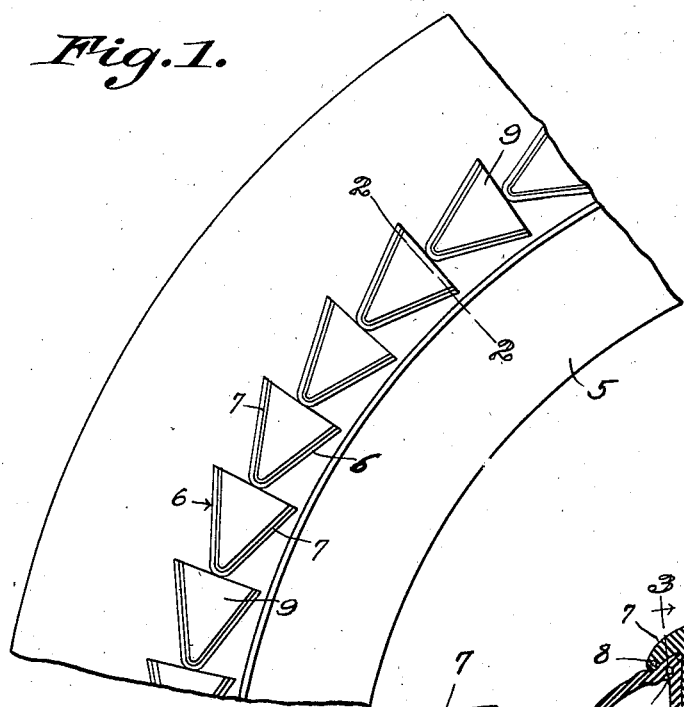
Figure 1 is a fragmental elevational view of a tire equipped with cups or pockets, constructed in accordance with the invention.
Figure 7:
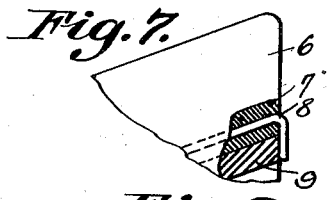
Figure 7 is a fragmental sectional view illustrating the means for preventing reverse movement of the cups or pockets, with respect to the securing member.

Referring to the drawing in detail, the reference character 5 designates a pneumatic tire casing used on airplane landing gear.

Vulcanized to the face of the outer side wall of the tire, are retaining members 6, each of which comprises a substantially triangular-shaped body formed with inwardly extended marginal flanges 7 along its edges, the flange being omitted at one of the edges of the body to permit the cup proper, to be slid into position under the flanges 7.

The flanges 7 are reenforced by the wire 8 which is molded within the flanges near the free edges thereof, the ends of the wire 8 being extended beyond the ends of the flanges, for purposes to be hereinafter more fully described.

Figures 2, 3:
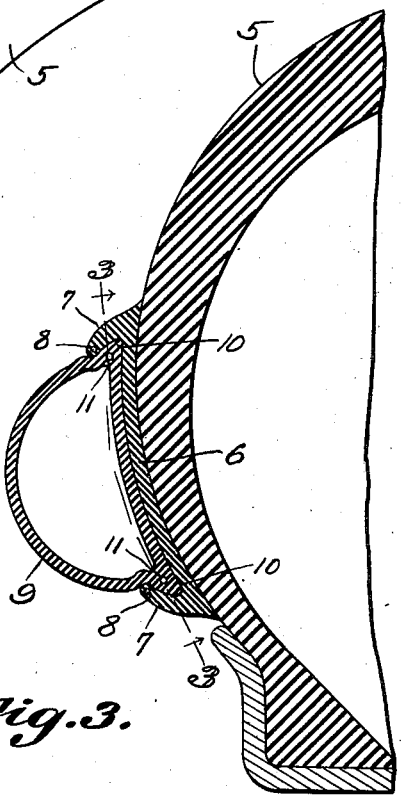
Figure 2 is a sectional view taken on line 2—2 of Fig. 1.
Figure 3 is a sectional view taken on line 3—3 of Fig. 2.

The cups which are held within the retaining members, are indicated by the reference character 9, the cups also being substantially triangular in shape and provided with reenforced extensions 10 adapted to fit under the flanges 7, as clearly shown by Fig. 2 of the drawing. These extensions are also reenforced by means of the wire 11 which is shown as extended throughout the length of the extensions. These wires tend to hold the flanges and extensions against expansion under the wind resistance to insure against the cups collapsing to defeat the purpose of the invention. The extended ends of the wire 8, are adapted to be bent laterally over the ends of the cups, to prevent accidental displacement of the cups by the centrifugal force rotating the wheel on which the tire is positioned.

Figure 4:
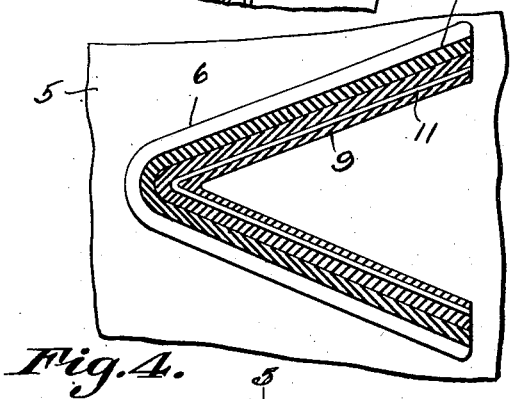
Figure 4 is a fragmental elevational view illustrating a modified form of the invention.
Figure 5:
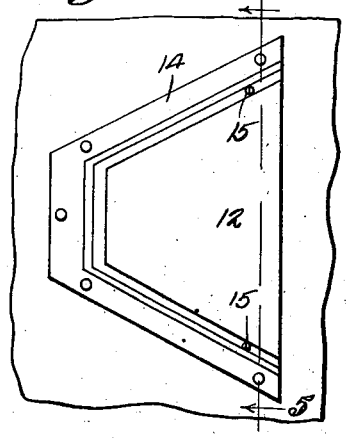
Figure 5 is a sectional view taken on line 5—5 of Fig. 4.
Figure 6:
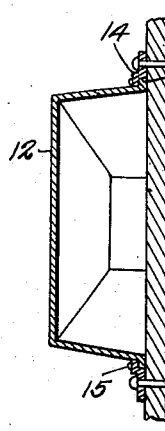
Figure 6 is an enlarged sectional view through the cooperating securing flanges that hold the removable pockets in place.

In the form of the invention as shown by Figs. 4 and 5 of the drawing, the cups, which are indicated by the reference character 12 are formed with lateral flanges 13 which are adapted to fit under the flange members 14 that are riveted or otherwise secured to the wheel proper. In this form of the invention the cups and flange members are constructed preferably of sheet metal material.

Threaded openings are formed in the flange members 14 and accommodate the screws 15 which screws are adapted to engage the flanges 13, securing the cups 12 in position.

From the foregoing it will be seen that due to the construction shown and described, the wheels of an airplane landing gear will be rotated by air pressure, when they are lowered for landing, with the result that when the wheels contact with the landing surface, the wheels will be rotating at a speed comparable to the speed of the airplane, thereby eliminating damage to the tire, caused by a non-rotating tire, contacting with the landing surface under the speed of the airplane making the landing.

Should the cups become damaged, it is obvious that they may be readily and easily removed and replaced, eliminating the necessity of replacing the tire to condition the plane for use.

It might be further stated that these cups which are triangular in formation, are arranged on the outer surface of a tire wall, the cups being disposed with their longitudinal axes extending circumferentially of the tire, the cups gradually tapering in the direction of rotation of the tire when the plane is landing.

What is claimed is:

1. In an airplane tire, a plurality of circumferentially spaced retaining members arranged on the tire, cups removably held within the retaining members, wires embedded in the retaining members, the ends of the wires extending beyond the retaining members and the extended ends of the wires adapted to engage the cups securing the cups within the retaining members.

2. In an airplane tire, a plurality of circumferentially spaced retaining members constructed of rubber material and vulcanized to the tire, cups removably held within the retaining members, said retaining members having wires embedded therein, the ends of the wires extending beyond the ends of the retaining members, said wires adapted to be extended laterally into engagement with the cups, securing the cups in position against accidental displacement.

CHARLES H. McCLASKEY.